March 31, 1959 — O. H. BANKER — 2,879,748
OPEN CENTER VALVE
Filed Feb. 13, 1956

INVENTOR.
Oscar H. Banker
BY
Charles F. Vrtech
Attorney

United States Patent Office 2,879,748
Patented Mar. 31, 1959

2,879,748

OPEN CENTER VALVE

Oscar H. Banker, Evanston, Ill., assignor to New Products Corporation, Skokie, Ill., a corporation of Delaware Application February 13, 1956, Serial No. 565,176

10 Claims. (Cl. 121—46.5)

This invention relates to axially slidable cylindrical valves and particularly to open center valves for power assisted manually operated devices such as power steering mechanisms.

Follow-up valves such as are generally employed in power steering mechanisms include relatively movable valve members and housings wherein the valve members are of the cylindrical type and are axially slidable in the valve housing. To cut off flow of fluid through the valve, a land on the valve must overlap the valve body adjacent the port to be cut off. The sensitivity of the valve depends upon the closeness of the fit between the valve body and the land, but there are practical limitations to the closeness dictated by the cost of the machining operation required. Where relatively large tolerances are used, a considerable overlap must be employed before sufficient resistance to the movement of the fluid is created to effect an acceptable stoppage of the fluid. Even under acceptable conditions, some leakage occurs which puts an added load on the pump or other source of fluid under pressure. On the other hand, if very close tolerances are employed to increase the sensitivity of the valve, then the closing of the valve is apt to be very sudden. The cost of maintaining such close tolerances is also quite likely to be prohibitive. Lack of sensitivity in a power steering valve is reflected as a sluggish response of the power mechanism to the manual steering effort. Extreme sensitivity of the valve on the other hand is reflected as a jerky operation of the steering mechanism.

It is an object of this invention to provide a valve which is very sensitive but which nevertheless does not require very close tolerances for its construction.

As another object, this invention seeks to provide a two stage valve wherein a bi-directional flow of fluid is first cut off from flow in one direction, and upon further movement of the valve in the same direction, cuts off flow of fluid in the opposite direction, the cutting off of fluid in the said one direction being accomplished by a very slight movement of the valve, while the shutting off of the fluid in the other direction is effected gradually by a pinching action.

Yet another object of this invention is the provision of a follow-up valve for a power steering mechanism or the like which is very sensitive in its operation, but which nevertheless does not require any close tolerances in its construction, and which, in fact, can be constructed entirely by ordinary screw machine operations without resorting to grinding or lapping.

Figure 1:
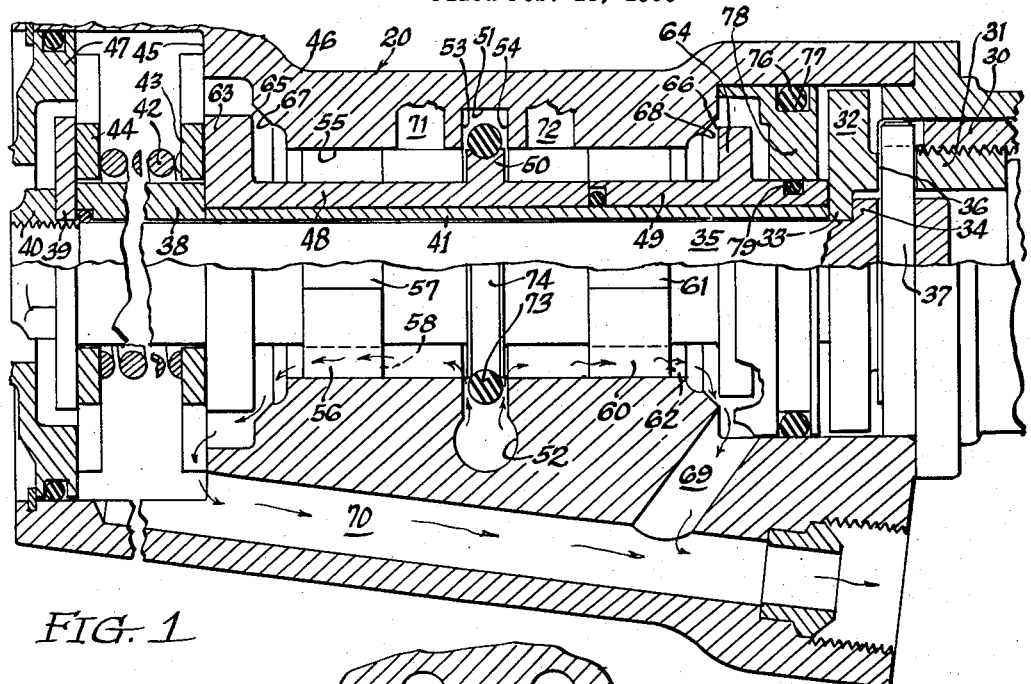
Figure 2:
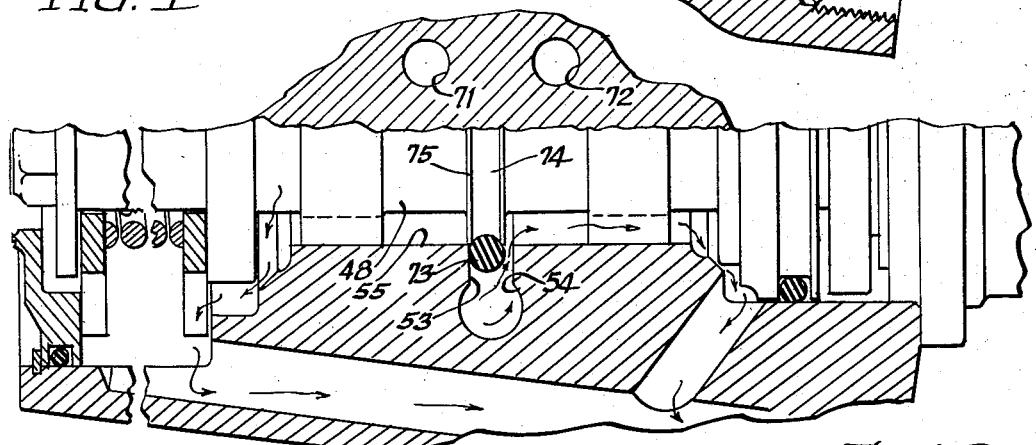
Figure 3:
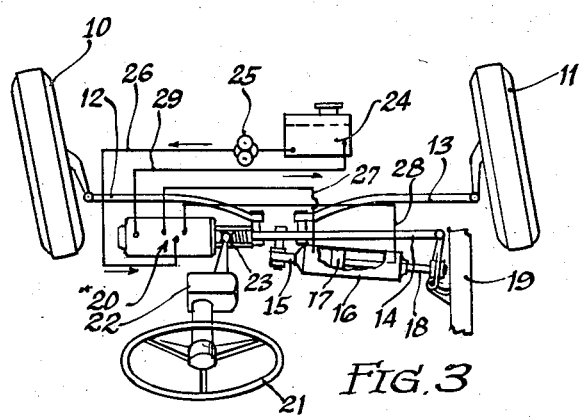

These and other objects and features of this invention will become apparent from the following detailed description when taken together with the accompanying drawings in which, Fig. 1 is a side elevational view, greatly enlarged, of a valve incorporating the features of this invention;

Fig. 2 is a corresponding fragmentary side elevation of the valve of Fig. 1, showing it in a preliminary stage of operation; and Fig. 3 is a schematic plan view, on a reduced scale, of a steering mechanism to which the valve of Fig. 1 may be applied.

Referring first to Fig. 3 for a general description of a typical environment in which the invention may operate, there are shown in that figure left and right front wheels 10 and 11, respectively, of an automotive vehicle, said wheels being oscillatable about substantially vertically axes by arms 12 and 13, respectively, extending inwardly from suitable connections to the wheels and having a universal connection with a transversely reciprocable link 14. Said link may be connected to an arm 15 transversely movable relative to the vehicle by a power cylinder 16 having a double acting piston 17 therein. In the form shown in Fig. 3 the piston rod 18 connected to the piston 17 is anchored to the frame 19 of the vehicle, while the cylinder is connected to link 14. It may be apparent that reciprocation of piston 17 in cylinder 16 will cause link 14 to reciprocate transversely of frame 19 and thereby cause wheels 10 and 11, through arms 12 and 13 and their connections with the wheels, to oscillate about their said vertical axes to steer the vehicle.

Also connected to link 14 is a valve mechanism 20 which controls the operation of cylinder 16 and which, in turn, is controlled by movement of steering wheel 21 and its connection, through a suitable worm drive 22, to a steering knuckle 23. The valve mechanism is driven by the steering knuckle but the construction is such that should there be a power failure, link 14 may be moved, through the valve by the knuckle 23.

Fluid for operating cylinder 16 may be derived from a suitable reservoir 24 of oil or the like from which the fluid is drawn and pressurized by a pump 25 driven in any suitable manner from the engine of the vehicle, and then conducted through a pipe 26 to an inlet port in valve 20. The fluid under pressure is directed by valve 20 to one side or the other of cylinder 16 through suitable pipes 27 and 28, and the exhaust from the cylinder is then returned through the valve and pipe 29 to reservoir 24.

The valve is shown in greater detail in Figs. 1 and 2. Knuckle 23 is connected to a sleeve 30 in a known manner, said sleeve being internally threaded to an inner sleeve 31 having formed at one end thereof a radially outwardly extending flange 32 and a radially inwardly extending flange 33, the latter abutting on a shoulder 34 formed in the right-hand end of a centrally disposed pin 35. Said pin and sleeve 30 are slotted, and a pin 37 extends through an opening 36 in sleeve 31 into the slots in sleeve 30 and pin 35 to prevent relative rotation between the sleeves and pin.

Pin 35 extends through valve 20 to the left-hand side thereof and then through a sleeve 38, washer 39 and nut 40, the latter being threaded on the left-hand end (Fig. 1) of pin 35. A spacer sleeve 41 is interposed between flange 33 and sleeve 38 so that when nut 40 is tightened upon pin 35, washer 39 and sleeves 38 and 41 are locked together against flange 33.

A spring 42 encircles sleeve 38 and is compressed between washers 43 and 44, said washers in turn bearing respectively upon a radial wall 45 on valve housing 46, and upon an abutment 47 which is axially fixed with respect to housing 46. Washers 44 and 39 overlap so that movement of washer 39 to the right as viewed in Fig. 1 causes washer 44 to move toward washer 43, and since the latter cannot move in that direction because of its contact with radial surface 45, spring 42 is compressed, that is, said spring 42 provides a restoring force for washers 44 and 39 until washer 44 strikes abutment 47.

The valve proper is comprised of sleeves 48 and 49 mounted on sleeve 41 with a fit which may be obtained by ordinary machining processes. Sleeve 48 is the longer of the two and is formed with a land 50 normally in axial alignment with a groove 51 in valve body 46 communicating with a bore 52, which in turn is in communication with pipe 26 leading from pump 25. Bore 52 therefore constitutes the valve inlet for the fluid under pressure, and groove 51 constitutes the inlet port for the valve. It may be noted that groove 51 is formed with substantially radially disposed side walls 53 and 54, the function of which will hereinafter be described. Valve sleeve 48 is adapted to reciprocate in valve bore 55 and to be guided therein by a cylindrical guide 56, the latter being slotted as at 57 and 58 to allow fluid to pass from one side to the other thereof. Ordinary machining tolerances of ±0.002 inch may be used between guide 56 and bore 55. Valve sleeve 49 is similarly mounted on sleeve 41 and is axially reciprocable in bore 55 with valve sleeve 48 and guided therein by a cylindrical guide 60 similarly provided with axially disposed slots 61 and 62 to permit fluid to pass from one side to the other thereof. The machining tolerance of ±0.002 inch may be used between guide 60 and bore 55. Each valve sleeve 48 and 49 is formed with a poppet valve 63 and 64, respectively, having corners 65 and 66 adapted to contact conical seats 67 and 68, respectively.

It may be observed that land 50 is narrower than groove 51 in an axial direction and that it is disposed substantially equidistantly from the sides 53 and 54 of the groove. Thus an opening is provided on either side of land 50 so that the fluid flows from groove 51 around land 50 to the left and right as viewed in Fig. 1 through the slots 57, 58 on one side and 61 and 62 on the other, and then through the space between valve corner 65 and valve seat 67 on one side and the corresponding valve corner 66 and valve seat 68 on the other side. Suitable bores 69 and 70 are provided for returning the fluid which passes through valves 63 and 64 to pipe 29 and reservoir 24. Thus, when land 50 is disposed centrally of groove 51, no pressure is built up on either side of it and hence no pressure is available to operate power cylinder 16. It may be observed from Fig. 2 that to build up pressure in the system it is necessary to seal one side of land 50 and to close the poppet valve on the other side. The confined fluid is then conducted through bores 71 and 72 in communication with pipes 27 and 28, respectively, to conduct fluid from valve 20 to one side or the other of power cylinder 16.

To direct fluid under pressure to one side or the other of power cylinder 16, sleeve 30 is moved to the right or left as the case may be, by the knuckle 23, and such movement is transmitted through sleeve 32, pin 35, nut 40, washer 39, and sleeve 38 to valve sleeve 48 in one direction, and through sleeve 32 and directly against the valve sleeve 49 in the other direction to cause land 50 to move toward one or the other of the surfaces 53 and 54 of groove 51. The sealing of the fluid by land 50 is accomplished by an O ring 73 retained in a shallow groove 74 in the outer periphery of land 50. Said groove 74 is of a depth which is less than one-half the radial dimension of the cross section of ring 73 and is preferably made with sloping sides or with sides which correspond in curvature to the contour of the ring 73. Ring 73 is preferably in tension when mounted in groove 50.

It may be observed that movement of the valve sleeve 48 to the left as shown in Fig. 2 will cause ring 73 to contact side 53 of groove 51 while the narrow portion 75 of the land 50 remaining after groove 74 has been cut therein overlaps the bore 55 of the valve body. The amount of overlap is extremely small and would be insufficient under ordinary circumstances to effect a seal. The contact between the O ring and the side of the groove 51, however, provides an initial seal and fluid under pressure then acts upon the opposite side of ring 73, that is, the side adjacent side 54 of the groove, to urge the O ring into firmer contact with the wall of the groove, thereby increasing the sealing effect. The pressure in the fluid, however, will not build up to any substantial amount until poppet valve 64 is closed. This latter action is effected by continued movement of pin 35 and its associated valves and sleeves to the left as viewed in Figs. 1 and 2 until corner 66 contacts conical seat 68. The movement of the corner toward the seat creates a pinching effect and a gradual build-up of pressure. The movement of pin 35 and its associated valves after sealing contact has been established between ring 73 and the radial walls 53, 54 of groove 51 causes relative axial and radial movement between the ring 73 and groove 74 because of the sloping sides of groove 74. This relative axial and radial movement results in an expansion of resilient ring 73 tending to resist such movement with increasing force as the movement proceeds and also prevents the ring 73 from becoming pinched between the groove 74 and the corner formed by bore 75 and walls 33, 54, thereby prolonging the life of ring 73.

Exhaust fluid in vent bore 69 is prevented from escaping to the right of the valve as viewed in Fig. 1 by a ring 78 spaced from valve 64 and sealed with respective thereto by an O ring seal 79 disposed in an extension of sleeve 49, and sealed with respect to valve housing 46 by an O ring 76 disposed in a peripheral groove 77 in the ring. It is contemplated that valve 64, though of the poppet type, will nevertheless be balanced with respect to the fluid on both sides thereof so that the closing of the passage to the left of land 50 by O ring 73 will not create a sudden surge of pressure axially of valve 64 to resist its closing and create a chatter. The space between valve 64 and ring 78 thus allows fluid under pressure to flow behind valve 64 to equalize the pressure of the fluid on the other side thereof.

In the operation of a power steering valve, it is absolutely necessary that a certain proportional feel be transmitted to the operator holding the wheel and guiding the vehicle. In this design this is provided by having poppet flanges 64 and 63 of sleeves 49 and 48, respectively, and their corresponding seats 68 and 67 larger in diameter than the bore 55. When the corner 66 approaches its seat 68 to pinch off the fluid and raise the pressure in line 72, this pressure in turn will act against the area of the larger diameter poppet 64, which transmits the pressure through its connecting elements, such as sleeves 32 and 30 and the steering arm 23 to the wheel in the hand of the operator. Therefore, the operator, in order to raise the pressure more and more on the port 72 must pull harder and harder on the wheel 21. This principle and mode of operation has been described and claimed in my copending application Serial No. 401,122, filed December 30, 1953, for Power Steering Valve.

It is also apparent that due to the reduction in the effective area on the right hand side of the power cylinder 16 (Fig. 3) because of the pressure of rod 18, for a given amount of effort to turn the wheels on the part of the operator, the unit pressure on this side must be higher than on the opposite side of the piston. It is therefore necessary to provide means that will equalize the amount of pull to be exerted by the operator for a given movement of the vehicle wheels in either direction, regardless of the fact that the one side has a higher pressure. In order to accomplish this, the diameter of the poppet on the side leading to the low unit pressure side, in this case poppet 64, is in the same proportion smaller in diameter than the poppet 63.

The looseness of the fit between sleeve 49 and bore 55, and the resilience in O ring 76 enables valve 64 to adjust itself radially into perfect alignment with its seat 68. The same looseness is present between valve sleeve 48 and bore 55 so that valve 63 may likewise adjust itself relative to its seat 67 to effect a perfect seal.

The same sequence of operation of land 50 and valve 63 takes place when the valve is moved to the right as viewed in Figs. 1 and 2. Thus O ring 73 will contact wall 54 prior to contact being established between corner 65 of valve 63 and conical seat 67 so that an initial closing of one of the outlets of the fluid stream without a material overlap between the valve and valve body takes place, and the final closing of the other outlet is effected gradually to avoid sudden shock to the apparatus controlled by the power cylinder.

The valve construction described above provides a valve which may be made inexpensively, using ordinary screw machines without any grinding or lapping operations. It provides a perfect seal on one side of an open center valve such as the one described above and hence increases the efficiency of the system. When applied to power steering devices, it provides more sensitivity to movements of the steering wheel than valves relying on an overlap between a land and a port.

It is understood that the foregoing description is merely illustrative of a preferred embodiment of the invention and that the scope of the invention is not to be limited thereto but is to be determined by the appended claims.

I claim:

1. A valve comprising a valve body having a bore, an inlet port in the body of predetermined axial length and extending circumferentially of the bore, a valve member axially slidable in the bore and having a land cooperable with the bore to close the bore, said land being of less axial length than the inlet port, a conical valve seat on the valve body spaced from the port, a second valve movable with the aforesaid valve and adapted to cooperate with the valve seat to prevent flow of fluid therebetween, and resilient means extending radially outwardly from the land into the port and movable with the land axially into contact with the valve body in the port to effect a fluid-tight seal between the land and valve body, said resilient means and second valve being spaced apart relative to the port and valve seat to cause the resilient means to effect a fluid-tight seal as aforesaid before the second valve contacts its said valve seat.

2. A valve as described in claim 1, said land having a shallow peripheral groove and said resilient means comprising a continuous ring of elastomeric material in tension in said groove.

3. A valve as described in claim 1, said port being comprised of a groove having a substantially radially disposed side wall for contact with the resilient means.

4. A valve as described in claim 1, a second conical valve seat disposed on the opposite side of the port from the first mentioned conical valve seat, and a third valve, movable with the land and adapted to cooperate with the second conical valve seat to prevent flow of fluid therebetween.

5. A valve comprising a valve body having a bore, an inlet port in the body, spaced exhaust ports one on either side of the inlet port, an elastomeric valve of the face type adapted to close the inlet port to one of the exhaust ports, a poppet valve adapted to close the inlet port to the other exhaust valve, a common means for operating both the elastomeric and poppet valves, said means being arranged to close the elastomeric valve before it closes the poppet valve, the closing of the elastomeric valve causing fluid under pressure to be directed toward the poppet valve, and means for admitting fluid under pressure behind the poppet valve to balance said poppet valve.

6. A valve comprising a valve body having a bore, an inlet port in the body, spaced exhaust ports, one on either side of the inlet port, an elastomeric valve of the face type adapted to close the inlet port to one of the exhaust ports, a metallic poppet valve adapted to close the inlet port to the other exhaust port, means for moving the poppet valve with the elastomeric valve, and means for hydraulically unbalancing the moving means axially in a direction to open both the elastomeric and poppet valves.

7. A valve as described in claim 6, said poppet valve comprising a sleeve, a flange extending radially outwardly from said sleeve intermediate the ends of the sleeve, and a frusto-conical seat on the valve body adapted to be contacted by the flange to cut off flow of pressure fluid therebetween, one of said exhaust ports being disposed on the side of the poppet valve remote from the inlet port.

8. A valve as described in claim 6, said poppet valve comprising a sleeve, a flange extending radially outwardly from said sleeve intermediate the ends of the sleeve, and a frusto-conical seat on the valve body adapted to be contacted by the flange to cut off flow of pressure fluid therebetween, one of said exhaust ports being disposed on the side of the poppet valve remote from the inlet port, and a ring mounted on the valve sleeve on the exhaust port side of the poppet valve and sealed with respect to the valve sleeve and housing, said ring being of greater diameter than the flange forming the poppet valve and exposed on one side to the pressure fluid on the exhaust side of the valve.

9. A valve as described in claim 6, said elastomeric valve comprising a land adapted to slide in the bore, said inlet port comprising a peripheral groove in the bore, said land having a shallow groove in the outer periphery thereof, and a ring of elastomeric material disposed in the shallow groove and extending radially outwardly into the inlet port, one side of the elastomeric ring being adapted to contact a side of the inlet port to seal the land with respect to said side of the inlet port.

10. A valve comprising a valve body having a bore, an inlet port in the body of predetermined axial length and extending circumferentially of the bore, a valve member axially slidable in the bore and having a land cooperable with the bore to close the bore, said land having a shallow groove in its periphery, and resilient means disposed in the groove and extending radially outwardly from the land into the port and movable with the land axially into contact with the valve body in the port to effect a fluid-tight seal between the land and body, said land and resilient means being relatively axially and radially movable after the resilient means is in contact with the valve body as aforesaid whereby to place the resilient means increasingly in tension to resist with correspondingly increased force the said relative axial movement.

References Cited in the file of this patent

UNITED STATES PATENTS

| | | |
|---|---|---|
| 997,500 | Holmen | July 11, 1911 |
| 1,921,092 | Newton | Aug. 8, 1933 |
| 2,702,529 | Doerfner | Feb. 22, 1955 |
| 2,743,707 | Kellersman | May 1, 1956 |